United States Patent

Slangen et al.

Patent Number: 6,039,275
Date of Patent: Mar. 21, 2000

[54] ASPARTAME POWDERS FOR POWDER MIXTURES

[75] Inventors: Hubertus J. M. Slangen, Stein; Astrid E. Kemper, Maastricht, both of Netherlands

[73] Assignee: Holland Sweetener Company V.O.F., Geleen, Netherlands

[21] Appl. No.: 09/224,350

[22] Filed: Jan. 4, 1999

Related U.S. Application Data

[63] Continuation of application No. PCT/NL97/00377, Jul. 3, 1997.
[60] Provisional application No. 60/036,845, Feb. 3, 1997.

[30] Foreign Application Priority Data

Jul. 4, 1996 [NL] Netherlands ............ 1003499

[51] Int. Cl.$^7$ .................................................. B00C 19/12
[52] U.S. Cl. ................................................ 241/17; 241/19
[58] Field of Search ........................ 560/41; 426/518; 241/65, 23, 17, 19

[56] References Cited

U.S. PATENT DOCUMENTS

| | | | |
|---|---|---|---|
| 5,358,186 | 10/1994 | Kataoka et al. | |
| 5,582,351 | 12/1996 | Tsau | 241/65 |
| 5,587,178 | 12/1996 | Slangen | |
| 5,623,079 | 4/1997 | Kataoka et al. | 560/41 |

FOREIGN PATENT DOCUMENTS 701 779   3/1996   European Pat. Off.

*Primary Examiner*—Mark Rosenbaum
*Attorney, Agent, or Firm*—Pillsbury Madison & Sutro LLP

[57] ABSTRACT

Aspartame powder for application in instant powder mixtures and instant desserts and consisting entirely or practically entirely of aspartame with a narrow particle size distribution with a $d_{50}$ value in the range of from 40 to 80 $\mu$m, with max. 10 wt %<20 $\mu$m and max. 10 wt %>150 $\mu$m; and process for the preparation, from dry or wet aspartame granules, of aspartame powder consisting entirely or practically entirely of aspartame, for application in instant powder mixtures and instant desserts, wherein granular aspartame having a moisture content of max. about 40 wt % is crushed, in dry or drying conditions at a temperature of 0–60° C., or while supplying drying air having a temperature of 100–180° C., in a first step in an impact mill while air is being supplied for discharging the crushed product from the mill, with drying if necessary to achieve a moisture content of less than 4 wt %, to a product in which at least 70 wt % of the particles is smaller than 150 $\mu$m and reducing in a second step immediately following on the first step, the fraction of particles <20 $\mu$m in the crushed product so obtained to less than 10 wt % with the aid of a fines sifter equipped with a rotary sifting wheel, in which process the air discharged from the impact mill, together with the crushed product, is supplied to the fines sifter without first separating any product out of the air discharged from the impact mill.

15 Claims, No Drawings

ASPARTAME POWDERS FOR POWDER MIXTURES

This is a Continuation of International Appln. No. PCT/NL97/00377 filed Jul. 3, 1997, also claims the benefit of U.S. Provisional No. 60/036,845 filed Feb. 3, 1997.

The invention relates to a process for the preparation, from dry or wet aspartame granules, of aspartame powders that are suitable for application in powder mixtures and entirely or practically entirely consist of aspartame.

Aspartame, hereinafter also referred to as APM, is the trivial name of α-L-aspartyl-L-phenylalanine methyl ester. It is a dipeptide sweetener having a sweetening power about 200× that of sugar. Aspartame is widely applied as a sweetener in a wide variety of edible products, soft drinks, sweets, medicines as well as in table-top sweeteners and the like. Aspartame, in combination with other products, is often used in the form of dry mixtures such as instant powder drinks and instant dessert products. Hereinafter, such dry mixtures are also referred to more generally as powder mixtures.

Unfortunately, the use of aspartame (powder) entirely or practically entirely consisting of aspartame as a starting material for the preparation of powder mixtures has hitherto often posed problems in the practical preparation of such mixtures. In the context of the present application, entirely or practically entirely consisting of aspartame means that the product in question contains no other components than the amounts of impurities and moisture present and falling within the normal product specifications for APM. Hereinafter, this is also referred to as 100 wt % APM. None of the commercially available aspartame products (powders and granular products based on 100 wt % APM) known to date are particularly suitable for such applications. This is mainly due to the fact that, ideally, the aspartame starting product for the preparation of powder mixtures must meet a number of requirements at the same time, some of which are intrinsically conflicting:

(1) good flow behaviour;

(2) fairly high bulk density, i.e. >300 kg/m$^3$;

(3) high dissolution rate (i.e. short dissolution time), even at relatively low temperature, without any particles remaining afloat and without clumping;

(4) no or extremely little dustiness, and (5) good miscibility in powder mixtures and not subject to segragation in such applications.

One way in which it was attempted in the past to prepare suitable aspartame powders is described in EP-A-0574983. It describes that aspartame containing at least 5 wt % particles <20 μm (hereinafter also referred to as dust or fines) and at least 10 wt % particles >400 μm is subjected to a multistage fractionation process: in a first step, a large proportion of the "small" particles (i.e. particles <50 or <40 or 30 or 20 μm) is removed by treatment in a fluid bed or with, for example, a Sweco Turbo Screen; subsequently, in a second step, a so-called initial product is obtained by sieving out the particles that are larger than a given upper limit in the range from 150 to 250 μm. Although the properties of the initial product so obtained may without any qualification be said to be good, in terms of for example dispersability, electrostatic behaviour, dustiness and free flow (and hence including good feedability), they are deficient in the envisaged application, especially in regard to the dissolution rate. The particle size distribution of the products made according to the processes mentioned in EP-A-0574983 will generally be such that the products have a $d_{50}$ in the range of from about 80 to about 130 μm and a $d_{97}$ in the range of from about 150 to about 250 μm. It appears not to be possible, using the method according to said patent publication, to obtain a product which has a $d_{97}$<150 μm and at the same time contains less than 3 wt %<20 μm.

A $d_{50}$ value of, for example, 100 μm is in the context of this application understood to mean that 50 wt % of the particles of the product concerned (powder) have a particle size such that this amount is retained on a sieve with an aperture size of 100 μm. The values for the $d_{97}$, etc., mentioned in this application should be interpreted analogously.

Moreover, it has in the meantime appeared to the applicant that the technique of EP-A-0574983 operates satisfactorily only if the dust content (i.e. particles <20 μm) of the starting material to be processed is not higher than approx. 20–30 wt %. When that same technique is applied in, for example, a fluid bed with such dust contents of 20–30 wt % or higher, fines removal, or dedusting, appears to be impossible because the starting product fails to fluidize in the fluid bed; dedusting does not occur even when attempts are made to fluidize the fluid bed by mechanical means (for example by vibration or application of a stirrer). Nor is a suitable technique as needed in the framework of the present invention obtained when an APM starting material with such high dust contents is treated in a Sweco Turbo Screen; plugging problems often arise then in the Sweco Turbo Screen. Consequently, the process of EP-A-0574983 is not suitable for finely ground aspartame.

The hitherto known commercially available aspartame products (powders) entirely or practically entirely consisting of aspartame often exhibit undesired dustiness and, also, a portion of the aspartame used in the preparation of powder mixtures tends to deposit on walls et cetera of the equipment used, and the dissolution rate is inadequate as a result of the occurrence of floating and/or clumping. Also, the product may on occasion contain too many coarse particles and this, too, has an adverse effect on the dissolution rate. In addition, segregation has been found to occur readily in the powder mixtures hitherto prepared and used, in which 100 wt % aspartame is used as one of the starting materials. As a result, samples taken from different locations in one and the same powder mixture charge often show significant variations in aspartame content. Accordingly, aspartame-containing powder mixtures according to the state of the art are relatively difficult to process because of the aforementioned aspects. Even so, aspartame-containing powder mixtures, because of their good flavouring properties et cetera, are often used in preparing instant drinks and instant desserts.

It should also be noted that, for specific aspartame applications, for example where APM needs to be tabletted, attempts have been made to prepare "integrated compositions" of APM and a carrier material, which contain besides lactose approx. 50 wt % (i.e. 20–80, preferably 40–60 wt %) APM, one of the aims being to improve the dissolution rate of APM. Refer to, for example, EP-A-0701779. However, a drawback of such compositions, when used in powder mixtures, is that processors are deprived of an important degree of freedom with respect to the preparation of powder mixtures having the composition and granulometry desired by them.

In consequence, there is a need for aspartame powders that can be produced on a large scale and in a simple and economically attractive manner and which, because of their complying with the requirements as to flow behaviour, bulk density, dissolution rate, dustiness and miscibility, are eminently suitable for application in instant powder mixtures and instant desserts.

Surprisingly, a process has now been found for producing such aspartame powders, in particular aspartame powders having a narrow particle size distribution, with a $d_{50}$ value in the range of from 40 to 80 μm and with max. 10 wt %<20 μm and max. 10 wt %>150 μm.

The aspartame powders obtained by the process of the present invention are particularly suitable for application in instant powder mixtures and instant desserts. Most suitable for application in instant powder mixtures and instant desserts are aspartame powders having a $d_{50}$ value in the range of from 40 to 80 μm, with max. 5 wt %<20 μm and max. 5 wt %>150 μm. It has moreover been found that these aspartame powders are particularly suitable for the preparation of tablets and sweets via direct compression.

The present invention thus relates to a process for the preparation, from aspartame granules, of aspartame powder which is falling within the normal product specifications of aspartame, for application in instant powder mixtures and instant desserts wherein granular aspartame having a moisture content of max. about 40 wt % is crushed, either (a) at a temperature of 0–60° C. when starting from dry granular aspartame having a moisture content of below 4 wt %, or (b) while supplying drying air having a temperature of 100–180° C. when starting from wet granular aspartame having a moisture content of at most approx. 40 wt %, in a first step in an impact mill while air is being supplied for discharging the crushed product from the mill, with drying if necessary to achieve a moisture content of less than 4 wt %, to a product in which at least 70 wt % of the particles is smaller than 150 μm and reducing in a second step immediately following on the first step, the fraction of particles <20 μm in the crushed product so obtained to less than 10 wt % with the aid of a fines sifter equipped with a rotary sifting wheel, in which process the air discharged from the impact mill, together with the crushed product, is supplied to the fines sifter without first separating any product out of the air discharged from the impact mill. Optionally the remaining product obtained in the second step is being sieved in a third step to a maximum particle size to be chosen in the range from 100 to 250 μm.

The process of the invention leads to aspartame powders having a narrow particle size distribution, with a $d_{50}$ value in the range of from 40 to 80 μm and with max. 10 wt %<20 μm and max. 10 wt %>150 μm.

In a first embodiment, starting from dry granular aspartame, at a temperature of 0–60° C., the process of the invention is carried out in dry conditions, particularly in conditions where the relative humidity of the ambient air in which the aspartame powder is produced from dry granular product is not higher than 80%. In such dry conditions the moisture content of the aspartame will remain below 4 wt % and the aspartame will absorb no or hardly any moisture. Ambient air with a relative humidity of 80% or lower can, without there being a need for any further treatment such as drying and the like, suitably be supplied to the impact mill in order to discharge the crushed product from the mill. This air is hereinafter also referred to as mill air. If desired, the mill air, before being supplied to the impact mill, may be adjusted to a predetermined relative humidity of 80% or lower. It goes without saying that, in the context of the application, mill air should be taken to include any other, sufficiently dry, inert gas stream that is capable of ensuring that the milling process proceeds well. Furthermore, it goes without saying that, if so desired, the mill air, before being used in the process, is treated in such a manner as to render it free from microbiological and other contaminations.

The dry (i.e. not containing more than 4 wt % moisture) granular APM to be used as starting material in this embodiment of the process of the invention can be obtained from aspartame using known granulation techniques. For example, wet granulation can be applied, followed by drying as described in for example EP-A-0255092; alternatively, drying and granulation may take place simultaneously, as described in for example EP-A-0530903. The granular APM can be obtained via a different technique by mechanical compacting of dry product, as described in for example EP-A-0585880. The granular aspartame particles may be completely spherical but may also have any other granular shape. Most often, however, the length-to-width (or thickness) ratio of the granules will not be higher than 2. The granular APM used as starting material preferably consists of granules of such granule size that >50 wt % is larger than 150 μm.

In a second embodiment, the process of the invention is carried out under drying conditions, starting from wet granular APM having a moisture content of at most approx. 40 wt % (based on the wet material; this can be achieved by applying partial drying in wet granulation methods as described in for example EP-A-0255092), while supplying drying air having a temperature of 100–180° C. and a relative humidity such that during the process the moisture content of the APM is reduced to approx. 4 wt % or less. Drying to a moisture content of about 4 wt % or less generally proceeds quickly and can be completed within a period ranging from a few seconds to a few minutes, for example in only 5 seconds. Under such drying conditions the moisture content of the aspartame will ultimately remain lower than 4 wt % and afterwards the aspartame will take up hardly any moisture, if at all. Ambient air heated to a temperature of 100–180° C. can, without any further treatment such as drying or the like being required, be suitably supplied to the impact mill to discharge the product dried and crushed therein. This air, too, is referred to as "mill air". If so desired, in this second embodiment the mill air can, before being supplied to the impact mill, also be set to a different, predetermined relative humidity, provided that the ultimate moisture content of the aspartame powders achieved therewith during drying and crushing is lower than about 4 wt %. Incidentally, it goes without saying that, in this embodiment too, "mill air" should be taken to include any other sufficiently dry, inert gas stream which is capable of ensuring that the drying and milling process proceeds well.

The advantage of the second embodiment is in particular that for the drying of wet (i.e. containing up to about 40 wt % moisture) granulate in the aspartame process no separate drying equipment is needed. An additional advantage compared with the first embodiment mainly consists in an intrinsically higher safety of the process due to the more humid atmosphere in the impact mill.

The aspartame from which the dry (i.e. containing about 4 wt % moisture or less) or wet (i.e. containing up to about 40 wt % moisture) granular APM has been formed may have been obtained from solutions in water or another solvent through static or stirred crystallization with cooling or through any other known crystallization technique, such as neutralization of the corresponding HCl salt or through application of a solvent gradient or the like.

In the first embodiment, in which dry granular APM is started from, the process of the invention is usually carried out at a temperature of 0–60° C.; at higher temperatures, especially in the case of longer residence times at increased temperature, there is a risk of degradation of the aspartame. Although in the second embodiment, starting from wet granular APM, the supplied mill air has a high temperature in the range of 100–180° C., the moisture content of the APM granules is still so high that the temperatures of the particles remains relatively low, usually lower than about 60–100° C., as a result of the evaporation of the moisture present in the particles. Furthermore, the residence time in the equipment is relatively short, for example from a few seconds to a few minutes.

The impact mill to be used for crushing of the granular APM in the first step may be any commercially available rotary mill operated using air, the so-called mill air, which may or may not be conditioned in terms of temperature and/or humidity and with which the crushed product is discharged from the mill. Preferably, the impact mill also contains a coarse sifter which separates oversize particles from the air stream and returns such particles to the milling track. This significantly improves the recovery efficiency for product having the ultimately desired particle size distribution. Examples of such impact mills are type C Hosokawa MikroPul mills, type Zirkoplex Alpine mills and so forth.

The milling process in the mill is adjusted so that at least 70 wt %, preferably at least 85 wt % of the APM particles discharged are smaller than 150 $\mu$m. This is easy to determine by those skilled in the art. The product crushed in the impact mill is discharged, preferably continuously, from the mill by means of the (mill) air used.

In the second process step, the size fraction <20 $\mu$m in the crushed product is reduced by means of a fines sifter. As explained in the introduction, the removal of such small aspartame particles from a crushed product containing 20–30 wt % or more fines is not well possible in practice using fluid bed separation or advanced sieving techniques such as those employed in a Sweco Turbo Screen. The inventors have found that, when the product crushed in the first step is immediately supplied, together with the mill air, to a fines sifter in which the size fraction <20 $\mu$m of that crushed aspartame is reduced so that not more than 10 wt % particles <20 $\mu$m remains in the product, an aspartame powder is obtained which is eminently suitable for application in instant powder mixtures and instant desserts. This is all the more surprising in that the presence of concentrations up to even 10 wt % of particles <20 $\mu$m in the product so obtained has no adverse effect on the properties of that product for application in powder mixtures. Preferably, the size fraction <20 $\mu$m of the crushed aspartame is so reduced that not more than 5 wt % particles <20 $\mu$m remains in the product. It has moreover been found that these aspartame powders are particularly suitable for the preparation of tablets and sweets via direct compression.

The size fraction <20 $\mu$m need not be completely removed from the product, however. Indeed, for attaining as high as possible a recovery efficiency for aspartame powders to be used in powder mixtures, it is advantageous to ensure that at least 3 wt % particles <20 $\mu$m remains present in the desired product. This also presents advantages in terms of the product's dissolution rate. However, according as the amount of particles <20 $\mu$m in the end product becomes larger and approaches 10 wt %, the flow behaviour and dustiness of the end product deteriorate somewhat, and there may also be more clumping, which also has an adverse effect on the dissolution rate. Those skilled in the art will be able to strike a good balance between the desired economy of the process and the product properties by weighing the various pros and cons of higher and lower concentrations of particles <20 $\mu$m in the end product provided that the concentration is less than 10 wt %.

An air classifier with a rotary sifter wheel (also known as classifier wheel) is preferably used as fines sifter. Most preferably, a cyclone sifter is used with a tapered classifier wheel mounted in vertical position. In an embodiment which is particularly advantageous because of the yields of desired product that can be attained with it, besides the amount of mill air from the first step already used, an additional amount of air is supplied in order to further improve sifting performance. Depending on the moisture content of the granular aspartame used as starting material, and/or possibly depending on the moisture content achieved in the aspartame obtained in the process of the invention, the temperature (and possibly the humidity) of the extra amount of air supplied will be chosen the same as that or those of the originally supplied amount of air or will be modified (usually lowered, while in the second embodiment even ambient air can be used). This can easily be established by a person skilled in the art. As a rule, the extra amount of air supplied will have no drying function. Examples of suitable fines sifters that can be used in the context of the present invention are type CS Hosokawa Mikropul cyclone sifters, type ATP-S Alpine Turboplex sifters and the like.

A cyclone sifter as meant here should not be confused with a cyclone separator as referred to in for example EP-A-0320523 for optional though non-essential separation of fines. Cyclone separators are by no means suitable for separation of fines in applications aimed at obtaining such products as those prepared by the present process, because (a) the cut size in a cyclone is approx. 5 $\mu$m whereas the desired cut size for the products of the present invention is approx. 20–30 $\mu$m, (b) the separation efficiency of a separator is generally very low, and (c) aspartame fines in a cyclone separator tend to form loose agglomerates which in further processing disintegrate and are not therefore separated effectively. Furthermore, '523 (p.6, 1.15) indicates that "Most preferred only the maximum particle size is controlled" (which appears to present advantages with respect to the release profile in for example chewing gum applications). Consequently, separation of fines is not recommended in '523.

Unwanted interim agglomeration of the smallest particles is prevented by supplying the exhaust air, i.e. the mill air, of the impact mill, to the fines sifter together with the product crushed in the first step without first separating the crushed product from the mill air. The presence of up to 10 wt % of such small particles in the end product appears not to present any problems, however; apparently, in that case, no or hardly any agglomeration of such small particles takes place in the end product.

If desired, the remaining product obtained in the second step, which contains up to 10 wt % particles <20 $\mu$m, can optionally be sieved in a third step to obtain a maximum particle size to be chosen in the range from 100 to 250 $\mu$m. To that end, use may be made of a vibrating sieve although in principle any type of sieve having the desired mesh width can be used. Preferably, the ultimately obtained aspartame powder suitable for application in powder mixtures contains at most 5 wt % particles >150 $\mu$m.

The invention will now be elucidated with reference to some examples and a comparative example.

The dissolution rate was determined on each occasion by adding 0.5 g of APM at 10° C. to 500 ml of a 6% citric acid solution in water while stirring with a magnetic stirrer at 470 rpm and monitoring how the dissolution process of APM proceeded in time by measuring UV absorption at 254 nm. The spectrophotometer was adjusted so that the UV absorption of the 6% citric acid solution served as the baseline. Maximum absorption occurs when all APM has dissolved. A quantitative impression of the dissolved amount of APM at any time, for example after 30 seconds, can readily be obtained by comparing the UV absorption at 254 nm with the maximum value. The dissolution rate of a given sample can of course also be determined by comparison with a known calibration line.

The angle of repose of the aspartame powders obtained was determined in accordance with ISO 4324 (i.e. the technique developed by Pfrengle).

EXAMPLE I
Starting From Dry Granular APM

At a relative humidity of 60%, granular APM with a moisture content of 3 wt % and a grain size distribution such that 94% was between 250 and 700 µm was crushed in a Hosokawa Mikropul ACM 30 mill equipped with a grinding disk and a coarse sifter, the throughput being 450 kg/h. The speed of the grinding disk was 2500–2700 rpm and the speed of the coarse sifter was 2050 rpm. The air flow through the mill was 2500–3000 kg/h. The air exiting together with crushed APM, whose particle size distribution was such that approx. 95 wt % was smaller than 150 µm, was immediately supplied to a Hosokawa MikroPul cyclone sifter equipped with a classifier wheel mounted in vertical position and a provision for supplying additional air. The speed of this fines sifter was 2650 rpm and 600 kg/h of additional air was supplied to the fines sifter for further improvement of sifting performance. In the fines sifter, 45–50 wt % of the product was separated, especially the particles <20 µm but also a substantial proportion of the particles ranging from 20 to 30 µm. The remaining product, i.e. the coarse stream, was supplied to an Allgaier TSM vibrating sieve with a mesh width of 150 µm. Approx. 10 wt % of the product supplied was separated out on this sieve as "oversize". The product of the main stream passing through the sieve (overall recovery efficiency 45–50%) had the following properties:

| fraction | |
| --- | --- |
| <150 µm | 100 wt % |
| <100 µm | 75 wt % |
| <50 µm | 19 wt % |
| <20 µm | 6 wt % |
| $d_{50}$ | 60 µm |
| angle of repose (ISO 4324) | 38° |
| bulk density | approx. 500 kg/m$^3$ |
| dissolution time (6% citric acid; 10° C.) | 95% dissolved in 30 seconds |

The product performed excellently in the preparation of powder mixtures and also in the preparation of sweets and tablets via direct compression.

EXAMPLE II
Starting From Dry Granular APM

At a relative humidity of 65%, granular APM with a moisture content of 3 wt % and a grain size distribution such that 94% was between 250 and 700 µm was crushed in a Hosokawa Mikropul ACM 10 mill equipped with a grinding disk and an coarse sifter, the throughput being 200 kg/h. The speed of the grinding disk was 3100 rpm and the speed of the coarse sifter was 1500 rpm. The air flow through the mill was 1000 kg/h. The air exiting together with crushed APM, whose particle size distribution was such that approx. 93 wt % was smaller than 150 µm, was immediately supplied to a Hosokawa MikroPul cyclone sifter equipped with a classifier wheel mounted in vertical position and a provision for supplying additional air. The speed of this fines sifter was 4000 rpm and 190 kg/h of additional air was supplied to the fines sifter for further improvement of sifting performance. In the fines sifter, 39 wt % of the product was separated out, especially the particles <20 µm but also a substantial proportion of the particles ranging from 20 to 30 µm. Thereafter, the oversize particles were no longer sieved. The product obtained (overall recovery efficiency 61%) had the following properties:

| fraction | |
| --- | --- |
| <150 µm | 93 wt % |
| <100 µm | 60 wt % |
| <50 µm | 16 wt % |
| <20 µm | 3 wt % |
| $d_{50}$ | 85 µm |
| angle of repose (ISO 4324) | 33° |
| bulk density | approx. 510 kg/m$^3$ |
| dissolution time (6% citric acid; 10° C.) | 86% dissolved in 30 seconds; 100% in 1 minute |

The product performed excellently in the preparation of powder mixtures and also in the preparation of sweets and tablets via direct compression.

Comparative Example
Starting From Dry Granular APM

At a relative humidity of 60%, granular APM with a moisture content of 3 wt % and a grain size distribution such that 94% is between 250 and 700 µm was crushed in a Hosokawa Mikropul ACM 10 mill equipped with a grinding disk and a coarse sifter, the throughput being 200 kg/h. The speed of the grinding disk was 4200 rpm and the speed of the coarse sifter was 1570 rpm. The air flow through the mill was 1000 kg/h. The air exiting together with crushed APM, whose particle size distribution was such that approx. 99 wt % was smaller than 150 µm, was immediately supplied to a Hosokawa MikroPul cyclone sifter equipped with a classifier wheel mounted in vertical position and a provision for supplying additional air. The speed of this fines sifter was 5000 rpm and 130 kg/h of additional air was supplied to the fines sifter for further improvement of sifting performance. In the fines sifter, 28 wt % of the product was separated out, especially the particles <20 µm but also a substantial proportion of the particles ranging from 20 to 30 µm. The remaining product, i.e. the coarse stream, was supplied to an Allgaier TSM vibrating sieve with a mesh width of 150 µm. Approx. 1.4 wt % of the product supplied was separated out on this sieve as "oversize". The product of the main stream passing through the sieve (overall recovery efficiency 70%) had the following properties:

| fraction | |
| --- | --- |
| <150 µm | 100 wt % |
| <50 µm | 54 wt % |
| <20 µm | 20 wt % |
| $d_{50}$ | 45 µm |
| angle of repose (ISO 4324) | 46 |
| bulk density | approx. 400 kg/m$^3$ |
| dissolution time (6% citric acid; 10° C.) | 46 dissolved in 30 seconds |

The product performed only moderately in the preparation of powder mixtures. The principal objection was the low dissolution rate. Nor was the product suitable for the preparation of sweets and tablets via direct compression.

EXAMPLE III
Starting From Wet Granular APM

Wet granular APM with a moisture content of about 36 wt % (based on the wet product) and a grain size distribution such that the $d_{50}$ was about 1.7 mm and about 80% of the grains was between 1.4 and 2.4 mm was crushed in a Hosokawa Mikropul ACM 10 mill equipped with a grinding disk and a coarse sifter, the throughput being 45 kg of wet product per hour. The speed of the grinding disk was 3100 rpm and the speed of the coarse sifter was 1500 rpm. The air flow through the mill was 1000 kg/h. The air entering the mill had a temperature of 150° C., the air exiting the mill 83° C. The air exiting together with the crushed APM, whose particle size distribution was such that approx. 97 wt % was smaller than 150 µm, was immediately supplied to a Hosokawa MikroPul cyclone sifter equipped with a classifier wheel mounted in vertical position and a provision for supplying additional air. The speed of this fines sifter was 4000 rpm and 190 kg/h of additional air was supplied to the fines sifter for further improvement of sifting performance. In the fines sifter, 30 wt % of the product was separated out, especially the particles <20 µm but also a substantial proportion of the particles ranging from 20 to 30 µm. Afterwards, no further sieving for coarse particles was carried out. The product obtained (overall recovery efficiency 70%, calculated as dry product) had the following properties:

| fraction | |
|---|---|
| <150 µm | 97 wt % |
| <100 µm | 85 wt % |
| <50 µm | 47 wt % |
| <20 µm | 7 wt % |
| $d_{50}$ | 54 µm |
| angle of repose (ISO 4324) | 46° |
| bulk density | approx. 330 kg/m³ |
| dissolution time (6% citric acid; 10° C.) | 100% dissolved in 1 minute |

The product performed excellently in the preparation of powder mixtures and could also be used for the preparation of sweets and tablets via direct compression.

We claim:

1. A process for the preparation of aspartame powder for application in instant powder mixtures and instant desserts, comprising
   (i) crushing granular aspartame having a maximum moisture content of about 40 wt % in an impact mill while air is being supplied for discharging the crushed product from the impact mill, with drying, if necessary, to achieve a moisture content of less than 4 wt. %, to obtain a crushed product in which at least 70 wt % of the particles are smaller than 150 µm, wherein said crushing is conducted
      (a) at temperature of 0–60° C. when starting from dry granular aspartame having a moisture content of below 4 wt %, or
      (b) when starting from wet granular aspartame having a moisture content greater than 4 wt % but at most approximately 40 wt %, supplying drying air having a temperature of 100–180° C.; and
   (ii) reducing immediately the fraction of particles <20 µm in the crushed product so obtained to less than 10 wt % using a fines sifter equipped with a rotary sifting wheel, wherein in said process, the air discharged from the impact mill, together with the crushed product, is supplied to the fines sifter without first separating any product out of the air discharged from the impact mill.

2. A process according to claim 1, wherein said granular aspartame has a grain size such that at least 50 wt % is larger than 150 µm.

3. A process according to either claim 1 or 2, wherein said supplied air with which the crushed product is discharged from the impact mill is conditioned in terms of temperature, humidity or both temperature and humidity.

4. A process according to claim 1, wherein said impact mill contains a mill track and contains a coarse sifter which separates oversize particles out of the air stream and returns them to the mill track.

5. A process according to claim 1, wherein in said process the amount of said fraction of particles <20 µm of the aspartame crushed in (i) is reduced in (ii) so that at least 3 wt % of the size fraction <20 µm remains in the product.

6. A process according to claim 1, wherein not more than 5 wt % particles <20 µm remain in the product.

7. A process according to claim 1, wherein in said process a large proportion of the fraction particles <20 µm are removed using said fines sifter, wherein said fines sifter comprises a cyclone sifter with a tapered classifier wheel mounted in a vertical position.

8. A process according to claim 7, wherein said process includes, besides the amount of impact mill air from the first process step, supplying an additional a mount of air to the fines sifter in order to further improve sifting performance.

9. A process according to claim 1, wherein a product is obtained containing not more than 10% of particles >150 µm.

10. A process according to claim 9, wherein the product obtained from said process contains not more than 5% of particles >150 µm.

11. A process according to claim 1, wherein remaining product obtained in (ii) is sieved to obtain a maximum particle size to be selected in the range from 100 to 250 µm.

12. A process according to claim 1, wherein said granular aspartame has a moisture content of below 4 wt %.

13. A process according to claim 1, wherein said granular aspartame comprises wet granular aspartame of greater than 4 wt % up to approximately 40 wt %.

14. A process according to claim 1, wherein said crushed product in (i) at least 85 wt % of the particles <150 µm.

15. A process according to claim 1, wherein said process further comprises (iii) sieving the product obtained so that the particles have a maximum size in the range of 100–250 µm.

* * * * *